(12) United States Patent
Gerrard et al.

(10) Patent No.: US 8,261,761 B2
(45) Date of Patent: Sep. 11, 2012

(54) SELECTIVELY MOVABLE SEAT ARRANGEMENT AND METHOD

(75) Inventors: David P. Gerrard, Magnolia, TX (US); Yang Xu, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 592 days.

(21) Appl. No.: 12/437,412

(22) Filed: May 7, 2009

(65) Prior Publication Data
US 2010/0282338 A1  Nov. 11, 2010

(51) Int. Cl.
*F16K 29/00*  (2006.01)

(52) U.S. Cl. ....... 137/1; 137/624.27; 137/330; 166/148; 251/359

(58) Field of Classification Search .............. 137/624.27, 137/330, 1; 166/148; 251/359
See application file for complete search history.

(56) References Cited

U.S. PATENT DOCUMENTS

| | | |
|---|---|---|
| 1,883,071 A | 12/1928 | Stone |
| 2,769,454 A | 11/1956 | Bletcher et al. |
| 2,812,717 A | 11/1957 | Brown |
| 2,822,757 A | 2/1958 | Colberly |
| 2,973,006 A | 2/1961 | Nelson |
| 3,007,527 A | 11/1961 | Nelson |
| 3,013,612 A | 12/1961 | Angel |
| 3,148,731 A | 9/1964 | Holden |
| 3,211,232 A | 10/1965 | Grimmer |
| 3,263,752 A | 8/1966 | Conrad |
| 3,358,771 A | 12/1967 | Berryman |
| 3,510,103 A | 5/1970 | Carsello |
| 3,566,964 A | 3/1971 | Livingston |
| 3,667,505 A | 6/1972 | Radig |
| 3,703,104 A | 11/1972 | Tamplen |
| 3,727,635 A | 4/1973 | Todd |
| 3,797,255 A | 3/1974 | Kammerer, Jr. et al. |
| 3,901,315 A | 8/1975 | Parker et al. |
| 3,954,138 A | 5/1976 | Miffre |
| 3,997,003 A | 12/1976 | Adkins |
| 4,067,358 A * | 1/1978 | Streich ............... 137/624.27 |
| 4,160,478 A | 7/1979 | Calhoun et al. |
| 4,176,717 A | 12/1979 | Hix |
| 4,190,239 A | 2/1980 | Schwankhart |

(Continued)

FOREIGN PATENT DOCUMENTS

EP  0427422 A2  5/1991

(Continued)

OTHER PUBLICATIONS

Notification of Transmittal of the International Search Report and the Written Opinion of the International Searching Authority; PCT/US2010/044856; Mailed Apr. 15, 2011.

(Continued)

*Primary Examiner* — Kevin Lee
(74) *Attorney, Agent, or Firm* — Cantor Colburn LLP (57) ABSTRACT

Disclosed herein is a selectively movable seat arrangement. The seat arrangement includes, one or more seat members movable between a passable position where a member is passable therethrough and an impassable position where the member is prevented from passing therethrough, and a counter in operable communication with the one or more seat members, the counter capable of allowing movement of the one or more seat members to the passable position to allow passage of a member a selected number of times and then to the impassable position thereby preventing passage of another such member for a period of time.

20 Claims, 6 Drawing Sheets

U.S. PATENT DOCUMENTS

| | | | |
|---|---|---|---|
| 4,246,968 A | 1/1981 | Jessup et al. | |
| 4,291,722 A | 9/1981 | Churchman | |
| 4,292,988 A | 10/1981 | Montgomery | |
| 4,355,685 A | 10/1982 | Beck | |
| 4,390,065 A | 6/1983 | Richardson | |
| 4,448,216 A | 5/1984 | Speegle et al. | |
| 4,478,279 A | 10/1984 | Puntar et al. | |
| 4,537,383 A | 8/1985 | Fredd | |
| 4,554,981 A | 11/1985 | Davies | |
| 4,566,541 A | 1/1986 | Moussy et al. | |
| 4,576,234 A | 3/1986 | Upchurch | |
| 4,583,593 A | 4/1986 | Zunkel et al. | |
| 4,669,538 A | 6/1987 | Szarka | |
| 4,711,326 A | 12/1987 | Baugh et al. | |
| 4,714,116 A | 12/1987 | Brunner | |
| 4,729,432 A | 3/1988 | Helms | |
| 4,823,882 A | 4/1989 | Stokley et al. | |
| 4,826,135 A | 5/1989 | Mielke | |
| 4,856,591 A | 8/1989 | Donovan et al. | |
| 4,893,678 A | 1/1990 | Stokley et al. | |
| 4,944,379 A | 7/1990 | Haaser | |
| 4,979,561 A | 12/1990 | Szarka | |
| 5,029,643 A | 7/1991 | Winslow et al. | |
| 5,056,599 A | 10/1991 | Comeaux et al. | |
| 5,230,390 A | 7/1993 | Zastresek et al. | |
| 5,244,044 A | 9/1993 | Henderson | |
| 5,297,580 A | 3/1994 | Thurman | |
| 5,305,837 A | 4/1994 | Johns et al. | |
| 5,335,727 A | 8/1994 | Cornette et al. | |
| 5,343,946 A * | 9/1994 | Morrill | 166/148 |
| 5,529,126 A | 6/1996 | Edwards | |
| 5,609,178 A | 3/1997 | Hennig et al. | |
| 5,704,393 A | 1/1998 | Connell et al. | |
| 5,762,142 A | 6/1998 | Connell et al. | |
| 5,775,421 A | 7/1998 | Duhon et al. | |
| 5,775,428 A | 7/1998 | Davis et al. | |
| 5,813,483 A | 9/1998 | Latham et al. | |
| 5,960,881 A | 10/1999 | Allamon et al. | |
| 6,050,340 A | 4/2000 | Scott | |
| 6,053,250 A | 4/2000 | Echols | |
| 6,079,496 A | 6/2000 | Hirth | |
| 6,102,060 A * | 8/2000 | Howlett et al. | 137/624.27 |
| 6,155,350 A | 12/2000 | Melenyzer | |
| 6,220,350 B1 | 4/2001 | Brothers et al. | |
| 6,227,298 B1 | 5/2001 | Patel | |
| 6,253,861 B1 | 7/2001 | Carmichael et al. | |
| 6,293,517 B1 | 9/2001 | Cunningham | |
| 6,378,609 B1 | 4/2002 | Oneal et al. | |
| 6,474,412 B2 | 11/2002 | Hamilton et al. | |
| 6,530,574 B1 | 3/2003 | Bailey et al. | |
| 6,547,007 B2 | 4/2003 | Szarka et al. | |
| 6,634,428 B2 | 10/2003 | Krauss et al. | |
| 6,644,412 B2 | 11/2003 | Bode et al. | |
| 6,666,273 B2 | 12/2003 | Laurel | |
| 6,668,933 B2 | 12/2003 | Kent | |
| 6,681,860 B1 | 1/2004 | Yokley et al. | |
| 6,712,145 B2 | 3/2004 | Allamon | |
| 6,712,415 B1 | 3/2004 | Darbishire et al. | |
| 6,834,726 B2 | 12/2004 | Giroux et al. | |
| 6,866,100 B2 | 3/2005 | Gudmestad et al. | |
| 6,896,049 B2 | 5/2005 | Moyes | |
| 6,948,561 B2 | 9/2005 | Myron et al. | |
| 6,983,795 B2 | 1/2006 | Zuklic et al. | |
| 7,150,326 B2 | 12/2006 | Bishop et al. | |
| 7,322,408 B2 | 1/2008 | Howlett | |
| 7,325,617 B2 | 2/2008 | Murray | |
| 7,337,847 B2 | 3/2008 | McGarian et al. | |
| 7,350,578 B2 | 4/2008 | Szarka et al. | |
| 7,377,321 B2 | 5/2008 | Rytlewski | |
| 7,387,165 B2 | 6/2008 | Lopez de Cardenas et al. | |
| 7,416,029 B2 | 8/2008 | Telfer et al. | |
| 7,467,664 B2 | 12/2008 | Cochran et al. | |
| 7,503,390 B2 | 3/2009 | Gomez | |
| 7,503,392 B2 | 3/2009 | King et al. | |
| 7,730,953 B2 | 6/2010 | Casciaro | |
| 7,832,472 B2 | 11/2010 | Themig | |
| 2001/0007284 A1 | 7/2001 | French et al. | |
| 2004/0007365 A1 | 1/2004 | Hill et al. | |
| 2005/0061372 A1 | 3/2005 | McGrath et al. | |
| 2005/0072572 A1 | 4/2005 | Churchill | |
| 2005/0126638 A1 | 6/2005 | Gilbert | |
| 2005/0205264 A1 | 9/2005 | Starr et al. | |
| 2006/0124310 A1 | 6/2006 | Lopez de Cardenas et al. | |
| 2006/0169463 A1 | 8/2006 | Howlett | |
| 2006/0175092 A1 | 8/2006 | Mashburn | |
| 2006/0213670 A1 | 9/2006 | Bishop et al. | |
| 2006/0243455 A1 | 11/2006 | Telfer et al. | |
| 2007/0012438 A1 | 1/2007 | Hassel-Sorensen | |
| 2007/0023087 A1 | 2/2007 | Krebs et al. | |
| 2007/0095538 A1 | 5/2007 | Szarka et al. | |
| 2007/0272413 A1 | 11/2007 | Rytlewski et al. | |
| 2008/0066924 A1 | 3/2008 | Xu | |
| 2008/0093080 A1 | 4/2008 | Palmer et al. | |
| 2008/0190620 A1 | 8/2008 | Posevina et al. | |
| 2008/0217025 A1 | 9/2008 | Ruddock et al. | |
| 2008/0308282 A1 | 12/2008 | Standridge et al. | |
| 2009/0032255 A1 | 2/2009 | Surjaatmadja et al. | |
| 2009/0044946 A1 | 2/2009 | Schasteen et al. | |
| 2009/0044955 A1 | 2/2009 | King et al. | |
| 2009/0056934 A1 | 3/2009 | Xu | |
| 2009/0056952 A1 | 3/2009 | Churchill | |
| 2009/0107680 A1 | 4/2009 | Surjaatmadja | |
| 2009/0159289 A1 | 6/2009 | Avant et al. | |
| 2009/0308588 A1 | 12/2009 | Howell et al. | |
| 2010/0294514 A1 | 11/2010 | Crow et al. | |
| 2011/0180274 A1 | 7/2011 | Wang et al. | |

FOREIGN PATENT DOCUMENTS

| | | |
|---|---|---|
| GB | 2281924 | 3/1995 |
| WO | 00/15943 | 3/2000 |

OTHER PUBLICATIONS

Notification of Transmittal of the International Search Report and the Written Opinion of the International Searching Authority; PCT/US2010/044383; Mailed Apr. 15, 2011.

International Search Report and Written Opinion of the International Searching Authority; PCT/US2010/044378; Mailed Mar. 17, 2011.

International Search Report; PCT/US2010/033737; Korean Intellectual Property Office; Mailed Jan. 24, 2011.

Nternational Search Report and Written Opinion; Date of Mailing Feb. 11, 2011; International Appln No. PCT/US2010/041049; International Search Report 5 Pages and Written Opinion 3 Pages.

International Search Report; Date of Mailing Jan. 24, 2011; International Appln No. PCT/US2010/034736; 3 Pages.

International Search Report; Date of Mailing Jan. 24, 2011; Internatiaonal Appln. No. PCT/US2010/034752; 3 Pages.

International Search Report; PCT/US2010/044399; International Searching Authority KIPO; Mailed Mar. 21, 2011.

Notification of Transmittal of the International Search Report and the Written Opinion of the International Searching Authority; PCT/US2010/054487; International Searching Authority; KIPO; Mailed Jun. 3, 2011.

Notification of Transmittal of the International Search Report and the Written Opinion of the International Searching Authority; PCT/US2010/049810; International Searching Authority KIPO; Mailed Apr. 25, 2011.

International Search Report and Written Opinion; Date of Mailing Aug. 29, 2011; International Application No. PCT/US2011/022523; International Filing Date Jan. 26, 2011; Korean Intellectual Property Office; International Search Report 5 pages; Written Opinion 3 pages.

TAP Completion System, Schlumberger, 4 pages, Dec. 2007.

RFID Keystone Module, RFID & Intelligent Products, Petrowell retrieved online on May 27, 2009 from: http://www.petrowell.co.uk/index2.php?option=com_docman&task=doc_view&gid=15 &Itemid=26.

Notification of Transmittal of the International Search Report and the Written Opinion of the International Searching Authority; PCT/US2011/041663; Korean Intellectual Property Office; Mailed Dec. 14, 2011; 8 pages.

Response to Office Action dated Oct. 15, 2008, in U.S. Appl. No. 11/891,713, U.S. Patent and Trademark Office, U.S.A.

Office Action dated Jun. 25, 2009, in U.S. Appl. No. 11/891,714, USPTO, U.S.A.
Office Action dated Jun. 19, 2009, in U.S. Appl. No. 11/891,715, U.S. Patent and Trademark Office, U.S.A.
Response to Restriction Requirement dated Apr. 22, 2009 in U.S. Appl. No. 11/891,715, U.S. Patent and Trademark Office, U.S.A.
Office Action dated Apr. 9, 2009, in U.S. Appl. No. 11/891,715, U.S. Patent and Trademark Office, U.S.A.
Notice of Allowance & Fees Due and Notice of Allowability dated Jan. 5, 2009, in U.S. Appl. No. 11/891,713, U.S. Patent and Trademark Office, U.S.A.
Office Action dated Jul. 16, 2008 in U.S. Appl. No. 11/891,713 U.S. Patent and Trademark Office, U.S.A.
International Search Report, Feb. 11, 2009 pp. 1-3, PCT/US2008/072732, Korean Intellectual Property Office.
Notification of Transmittal of the International Search Report and the Written Opinion of the International Searching Authority, Or the declaration, Feb. 11, 2009, pp. 1-4, PCT/US2008/072732, Korean Intellectual Property Office.
Notification of Transmittal of the International Search Report and the Written Opinion of the International Searching Authority, Or the declaration, Feb. 11, 2009, pp. 1-4, PCT/US2008/072734, Korean Intellectual Property Office.
Written Opinion of the International Searching Authority, Feb. 11, 2009, pp. 1-3, PCT/US2008/072732, Korean Intellectual Property Office.
Written Opinion of the International Searching Authority, Feb. 11, 2009, pp. 1-4, PCT/US2008/072734, Korean Intellectual Property Office.
International Search Report, Feb. 11, 2009, pp. 1-3, PCT/US2008/072734, Korean Intellectual Property Office.
International Search Report, Feb. 11, 2009, pp. 1-3, PCT/US2008/072735, Korean Intellectual Property Office.
Ross, C. M., et al., "Current Materials and Devices for Control of Fluid Loss," SPE 54323, Apr. 1999, pp. 1-16.
Hoffman, C.R., "One-Trip Sand-Control/Liner Hangar/ Big-Bore Completion System," SPE 101086, Sep. 2006, pp. 1-10.
G.L. Rytlewski, A Study of Fracture Initiation Pressures in Cemented Cased-Hole Wells Without Perforations, May 15, 2006, pp. 1-10, SPE 100572, Society of Petroleum Engineers, U.S.A.
Boscan, J., et al., "Successful Well Testing Operations in High-Pressure/High-Temperature Encironment; Case Histories," SPE 84096, Oct. 2003, pp. 1-15.
Brad Musgrove, Multi-Layer Fracturing Solution Treat and Produce Completions, Nov. 12, 2007, pp. 1-23, Schlumberger, U.S.A.
StageFRAC Maximize Reservoir Drainage, 2007, pp. 1-2, Schlumberger, U.S.A.

* cited by examiner

SELECTIVELY MOVABLE SEAT ARRANGEMENT AND METHOD

BACKGROUND

In industries concerned with earth formation boreholes, such as hydrocarbon recovery and gas sequestration, for example, it is not uncommon for various operations to utilize a temporary or permanent plugging device. Sometimes plugging is desirable at a first location, and subsequently at a second location. Moreover, additional plugging locations may also be desired and the plugging can be sequential for the locations or otherwise. Systems employing droppable members, such as balls, for example, are typically used for just such purpose. The ball is dropped to a ball seat positioned at the desired location within the borehole thereby creating the desired plug.

In applications where the first location is further from surface than the second location, it is common to employ seats with sequentially smaller diameters at locations further from the surface. Dropping balls having sequentially larger diameters allows the ball seat furthest from surface to be plugged first (by a ball whose diameter is complementary to that seat), followed by the ball seat second furthest from surface (by a ball whose diameter is complementary to that seat) and so on. The foregoing system, however, creates increasingly restrictive dimensions within the borehole that can negatively impact flow therethrough as well as limit the size of tools that can be run into the borehole. Systems and methods that allow operators to plug boreholes at multiple locations without the drawbacks mentioned would be well received in the art.

BRIEF DESCRIPTION

Disclosed herein is a selectively movable seat arrangement. The seat arrangement includes, one or more seat members movable between a passable position where a member is passable therethrough and an impassable position where the member is prevented from passing therethrough, and a counter in operable communication with the one or more seat members, the counter capable of allowing movement of the one or more seat members to the passable position to allow passage of a member a selected number of times and then to the impassable position thereby preventing passage of another such member for a period of time.

Further disclosed herein is a method of selectively allowing one or more members to pass a seat arrangement before preventing a member from passing the seat arrangement. The method includes, engaging the seat arrangement with one or more members, removing the seat arrangement and allowing the one or more members to pass the seat arrangement, engaging the seat arrangement with an additional member, and maintaining the seat arrangement and preventing the additional member from passing the seat arrangement.

Further disclosed herein is a system. The system includes, a restriction engager, one or more restrictions, and at least one counter configured to permit or prevent passage of a restriction engager through one of the one or more restrictions.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments of the selectively movable seat arrangement disclosed herein are positionable within a borehole tubular or open hole and maintain a seat arrangement or restriction to a member or restriction engager after having allowed a selected number of restriction engagers to pass therethrough. When the restriction is maintained, the restriction engager can sealingly engage the restriction thereby sealing the borehole tubular to flow therepast. Such a seal allows for the creation of a pressure differential in the borehole that is usable by operators for such things as actuation of tools and fracturing of formations, for example.

Figure 1:
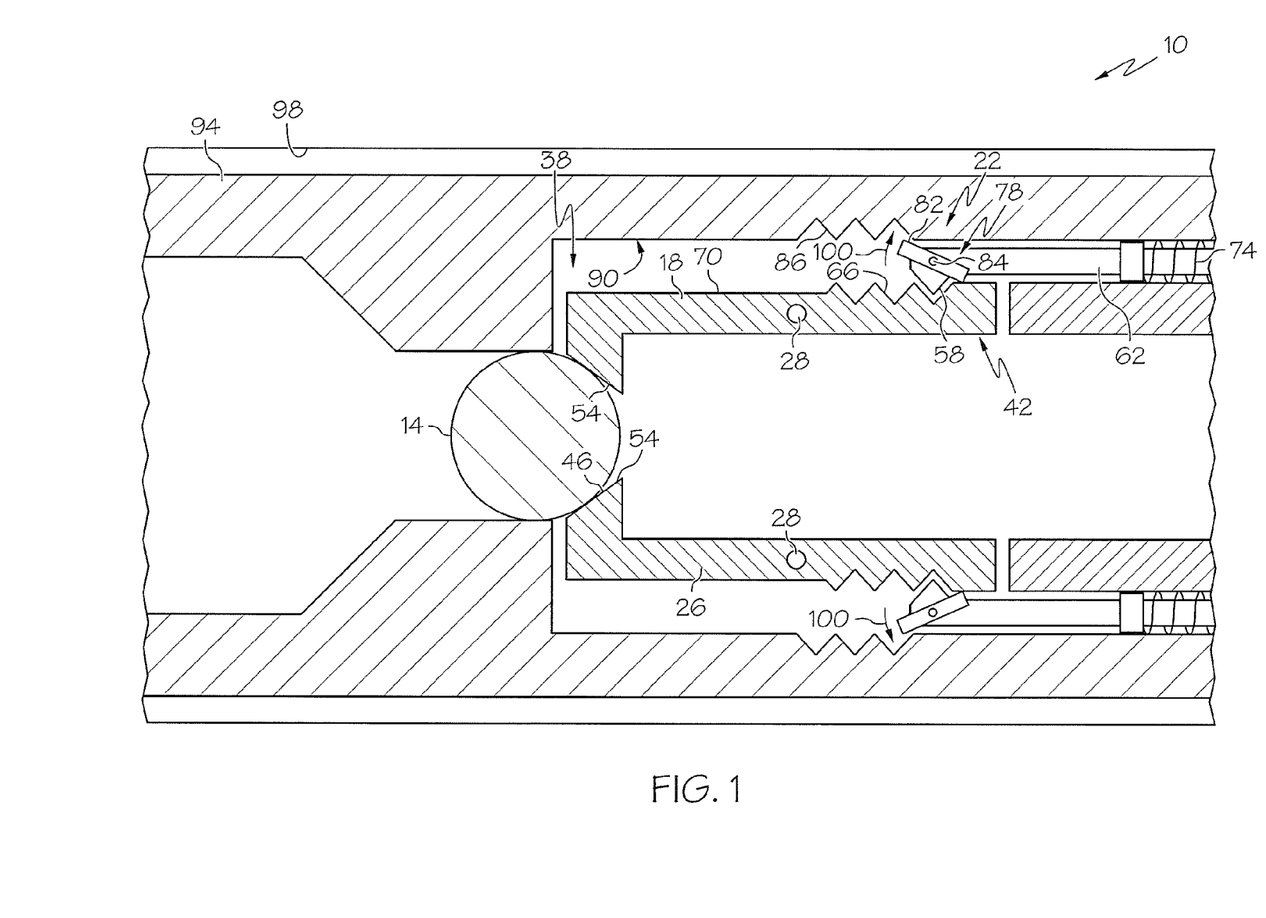
FIG. 1 depicts a cross sectional view of a selectively movable seat arrangement disclosed herein in a resting position.
Figure 2:
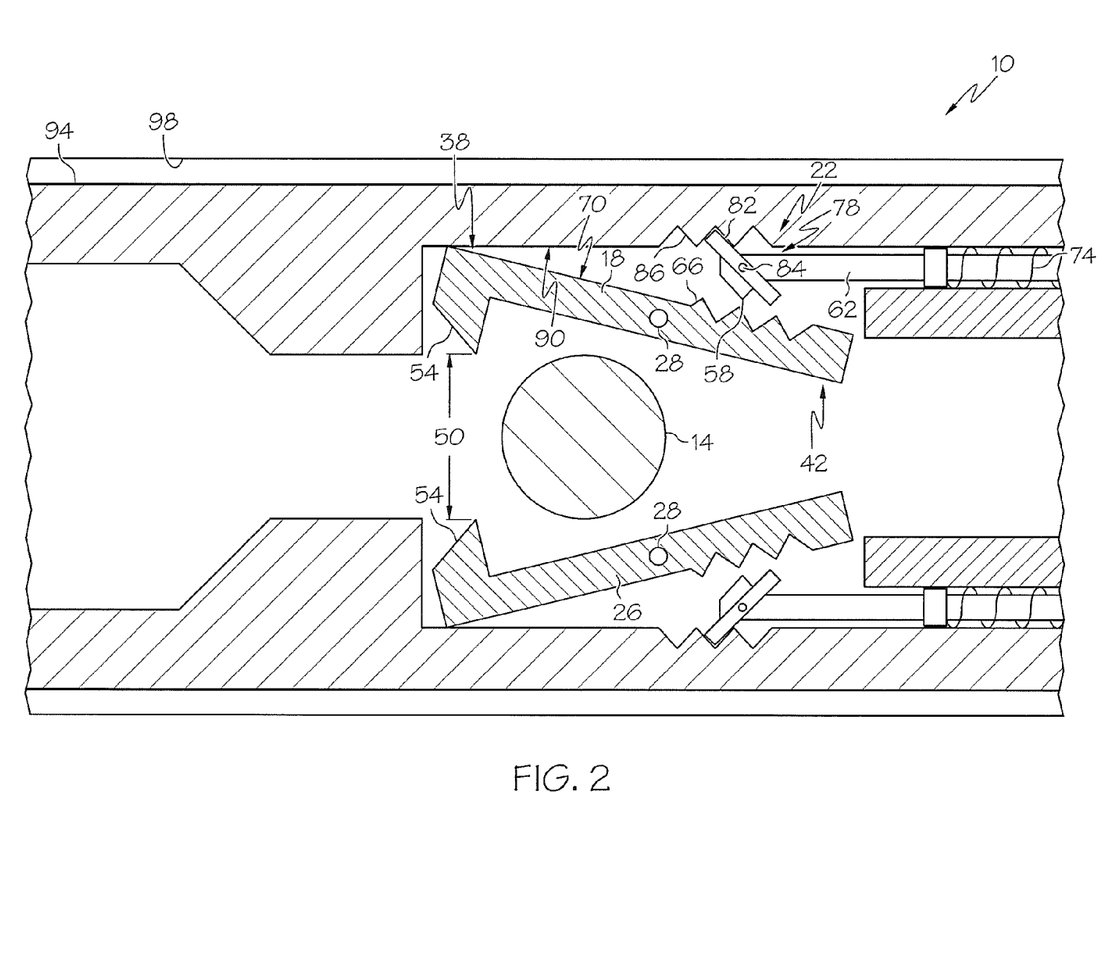
FIG. 2 depicts a cross sectional view of the selectively movable seat arrangement of FIG. 1, shown in an open position.

Referring to FIGS. 1 and 2, an embodiment of the selectively movable seat arrangement 10 disclosed herein in a resting position and an open position, respectively. The selectively movable seat arrangement also described herein as a selective landing configuration 10 includes, a member described herein as a restriction engager 14 and illustrated herein as a ball, one of one or more seat arrangements described herein as restrictions 18 and illustrated herein as a ball seat, and a counter 22. The counter 22 is configured to index each time one of the restriction engagers 14 passes through the restriction 18. The restriction 18, of this embodiment, has a plurality of pivot arms 26 that are pivotal about pivot points 28 between an impassable position also referred to herein as a first pivot arm position and a passable position also referred to herein as a second pivot arm position. Each of the pivot arms 26 has a first end 38 and a second end 42. When in the first pivot arm position (shown in FIG. 1) the first ends 38 are adjacent to one another to form a ring shaped continuous reduced dimension surface 46 with which the restriction engager 14 is engagable. It should be noted that the restriction engager 14 may sealingly engage with the reduced dimension surface 46, however, it is not required. When in the second pivot arm position (shown in FIG. 2) the first ends 38 are displaced radially outwardly defining an opening 50 sized to permit passage of the restriction engager 14 therethrough. The pivot arms 26 in one embodiment may be rotationally biased by a biasing member (not shown) such as a torsional spring, for example, that biases them toward the first pivot arm position.

Movement of the pivot arms 26 from the first pivot arm position to the second pivot arm position is accomplished by urging a restriction engager 14 therethrough with pressure, for example. Ramped surfaces 54 on the first ends 38 are configured to cause the first ends 38 to move radially outwardly in response to a restriction engager 14, such as a ball, being urged thereagainst. Movement of the pivot arms 26 to the second pivot arm position causes the second ends 42 to move radially inwardly. This radial inward movement causes a tooth 58 on each of a plurality of rams 62 to disengage teeth 66 on an outer radial surface 70 of the second ends 42 of the pivot arms 26. Once the tooth 58 of the ram 62 is disengaged the ram 62 is able to move longitudinally under a biasing load provided by a biasing member 74, disclosed herein as a compression spring.

An escapement 78, illustrated herein as a lever 82 pivotal about pivot point 84, engages with teeth 86 on an inner surface 90 of a tubular 94, such as a casing or drillstring, positioned within a wellbore 98, limits the longitudinal movement of the ram 62. The lever 82 and teeth 86 are sized and positioned to allow the ram 62 to advance only a specific dimension each time the tooth 58 disengages from the teeth 66. This dimension coincides with the spacing between the adjacent teeth 66. In so doing, the escapement 78 assures that the tooth 58 will reengage with the next tooth 66 each time the pivot arms 26 return to the first pivot arm position. The lever 82 can be rotationally biased, in a direction of arrow 100, by a biasing member (not shown) such as a torsional spring, for example, to assure that the lever 82 engages with the teeth 86.

Figure 3:
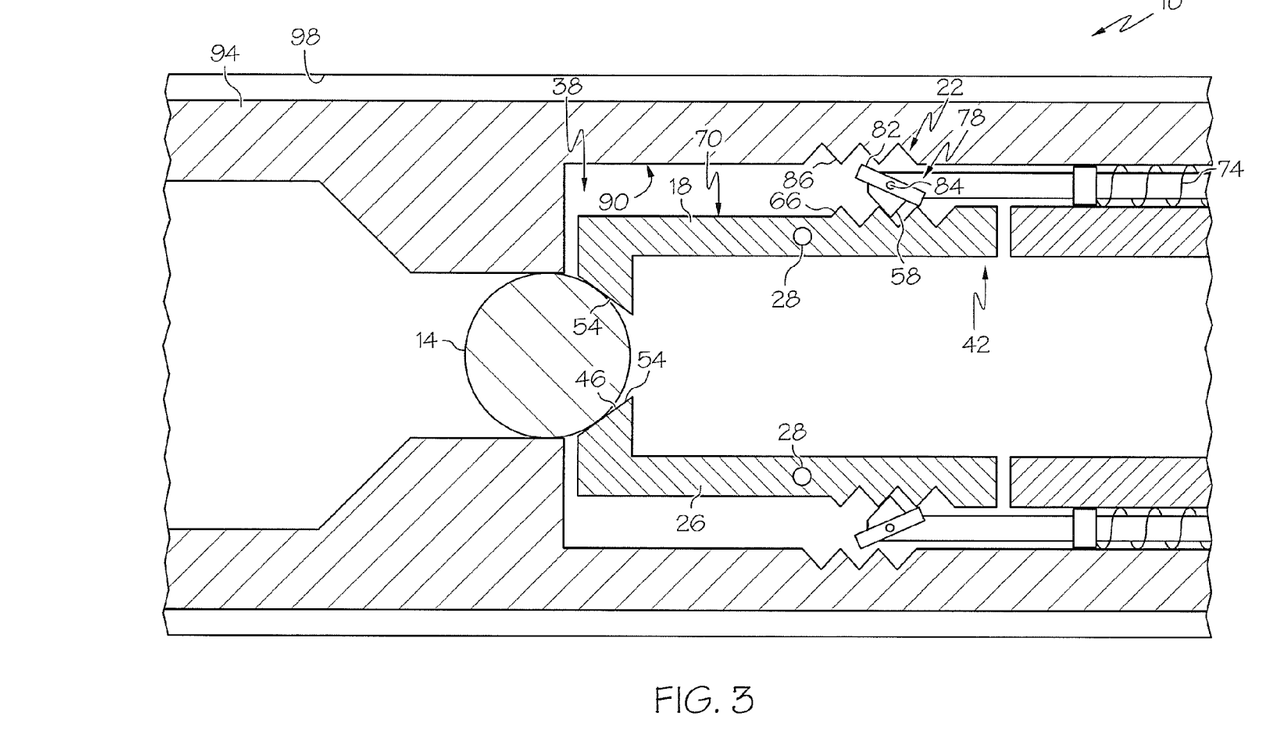
FIG. 3 depicts a cross sectional view of the selectively movable seat arrangement of FIG. 1, shown after having passed one restriction engager.

Referring to FIG. 3, the lever 82 can also be sized such that it contacts the outer radial surface 70 when the pivot arms 26 are moved back to the first pivot arm position thereby rotating the lever 82 in a direction opposite to the direction of arrow 100, disengaging the lever 82 from the teeth 86 in the process. (Note: the radial surface 70 also exists between each of the teeth 66). By doing so the lever 82 is properly positioned to engage with the next tooth 86 as soon as the pivot arms 26 begin pivoting again toward the second pivot arm position. This sequential indexing of the tooth 58 along the teeth 86 defines the counter 22.

Figure 4:
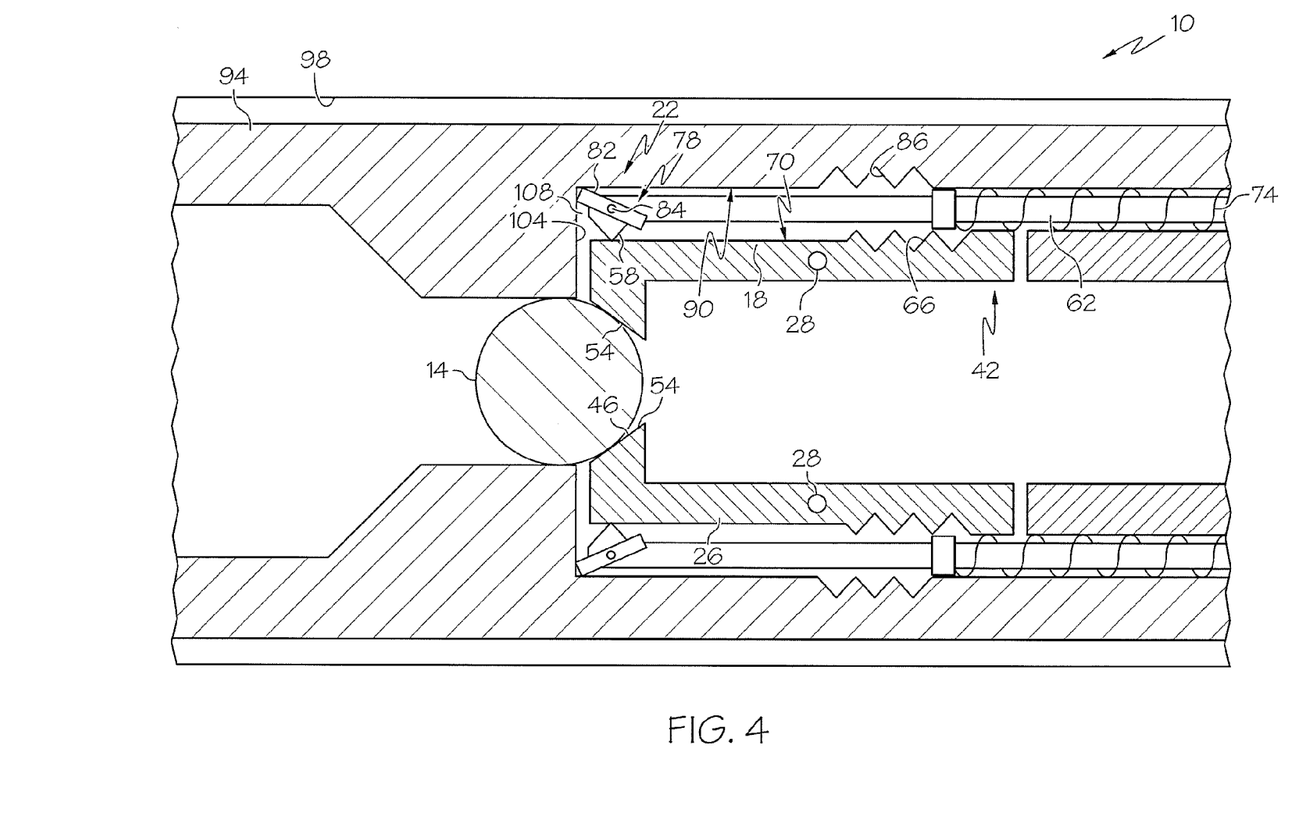
FIG. 4 depicts a cross sectional view of the selectively movable seat arrangement of FIG. 1, shown preventing passage of a restriction engager after having passed a selected number of the restriction engagers.

Referring to FIG. 4, the number of teeth 66 is selected to establish the number of restriction engagers 14 that the counter 22 will allow to pass the restriction 18. Once the lever 82 is disengaged from the last tooth 66 the lever 82 will continue to be biased against the surface 90. However, without any additional teeth 66 for the lever 82 to engage there is nothing to stop the ram 62 from moving under the urging of the biasing member 74. As such, the ram 62 will stroke until contact is made with a stop 104, shown here on the tubular 94, although other mechanical features definable of full travel of the ram 62 are contemplated.

An annular dimension of the first end 38 of the pivot arms 26 is set to essentially fill an annular gap 108 defined between the outer radial surface 70 and the inner surface 90. By filling the annular gap 108, the first end 38 prevents any additional radial outward pivoting of the pivot arms 26. This non-pivoting condition of the pivot arms 26 maintains the restriction 18 thereby preventing passage of the restriction engager 14 and providing a sealing seat for the restriction engager 14 to seal to. The foregoing structure allows an operator to selectively set how many restriction engagers 14 will pass each restriction 18 before the restriction 18 is maintained, thereby preventing additional restriction engagers 14 from passing.

Figure 5:
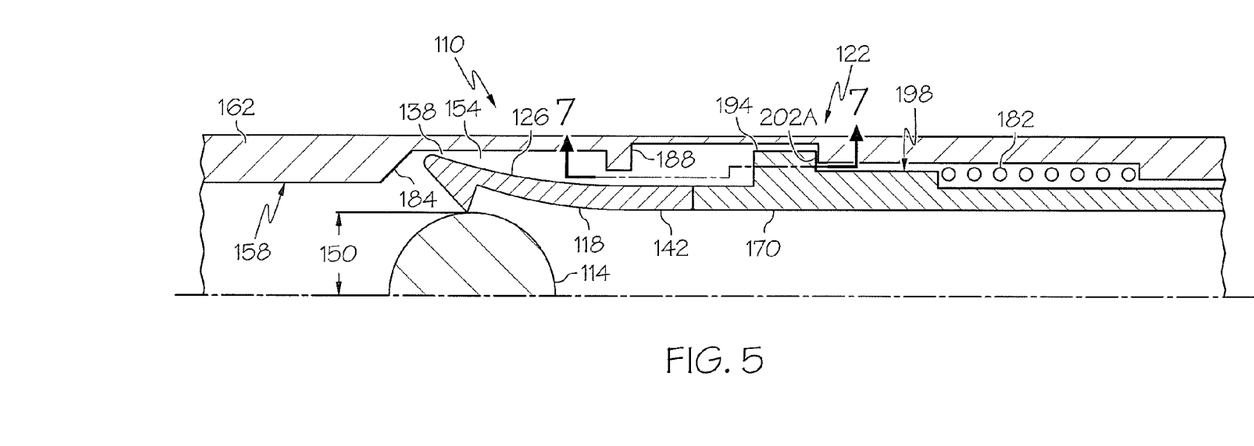
FIG. 5 depicts a partial cross sectional view of an alternate embodiment of a selectively movable seat arrangement disclosed herein shown in a restriction engager passing position.
Figure 6:
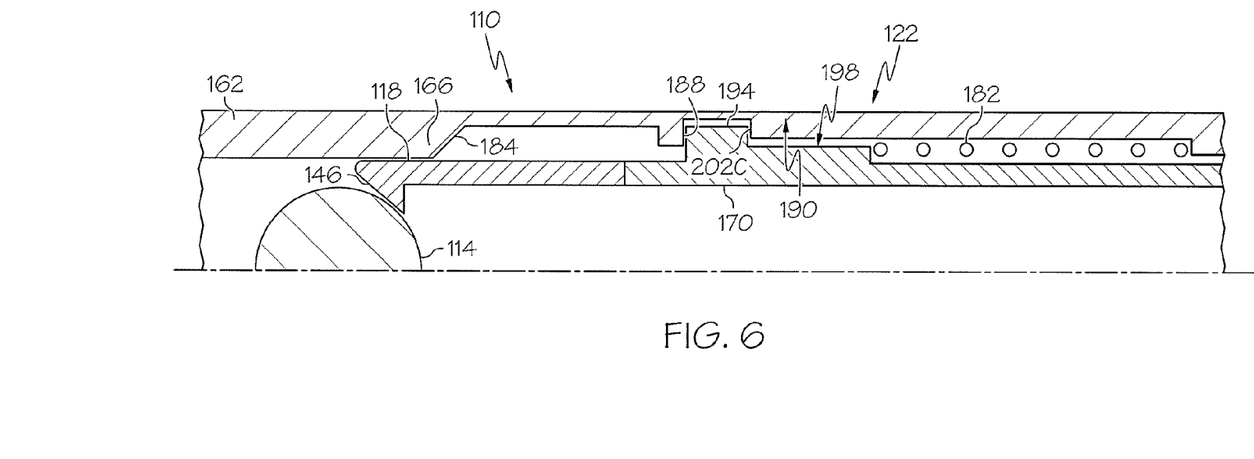
FIG. 6 depicts a partial cross sectional view of the selectively movable seat arrangement of FIG. 5 shown in a restriction engager non-passing position.

Referring to FIGS. 5 and 6, an alternate embodiment of a selective landing configuration 110 is illustrated. As with the landing configuration 10 the landing configuration 110 permits a selectable number of restriction engagers 114 to pass a restriction 118 before a counter 122 maintains the restriction 118 impassable by additional restriction engagers 114. The counter 122 is configured to index each time one of the restriction engagers 114 passes through the restriction 118. The restriction 118, of this embodiment, has a plurality of deformable arms 126 that are able to elastically deform between an impassable position also referred to herein as a first deformable arm position and a passable position also referred to herein as a second deformable arm position in the fashion of a collet. Each of the deformable arms 126 has a first end 138 and a second end 142.

When in the first deformable arm position (shown in FIG. 6) the first ends 138 seal to one another to form a ring shaped continuous reduced dimension surface 146 that is sealingly engagable with the restriction engager 114. When in the second deformable arm position (shown in FIG. 5) the first ends 138 are displaced radially outwardly defining an opening 150 sized to permit passage of the restriction engager 114 therethrough. An annular recess 154 in an inner radial surface 158 of a tubular 162 within which the landing configuration 110 is positioned, receives the first ends 138 as the deformable arms 126 are deformed. A nonrecessed portion 166 of the inner radial surface 158 maintains the deformable arms 126 in a nondeformed orientation (first deformable arm position) when the first ends 138 are longitudinally aligned therewith. It is precisely this longitudinal alignment between the first ends 138 of the deformable arms 126 and the nonrecessed portion 166 that the counter 122 controls to allow or prevent the passing of the restriction engager 114.

The counter 122 includes a rotationally indexable sleeve 170 that is longitudinally movable against a biasing member 182 that longitudinally biases the sleeve 170 and the deformable arms 126 in a direction wherein the nonrecessed portion 166 radially supports the deformable arms 126. The restriction 118 and the sleeve 170 are therefore longitudinally movable in response to a restriction engager 114 contacting the deformable arms 126 and providing a longitudinal urging against them in response to pressure applied thereto. The biasing member 182 can reset the sleeve 170 and the deformable arms 126 back to the first deformable arm position after the restriction engager 114 has passed therethrough. Ramped surfaces 184 assure the deformable arms 126 return to the first deformable arm position while also preventing them from wedgably engaging within the annular recess 154.

Figure 7:
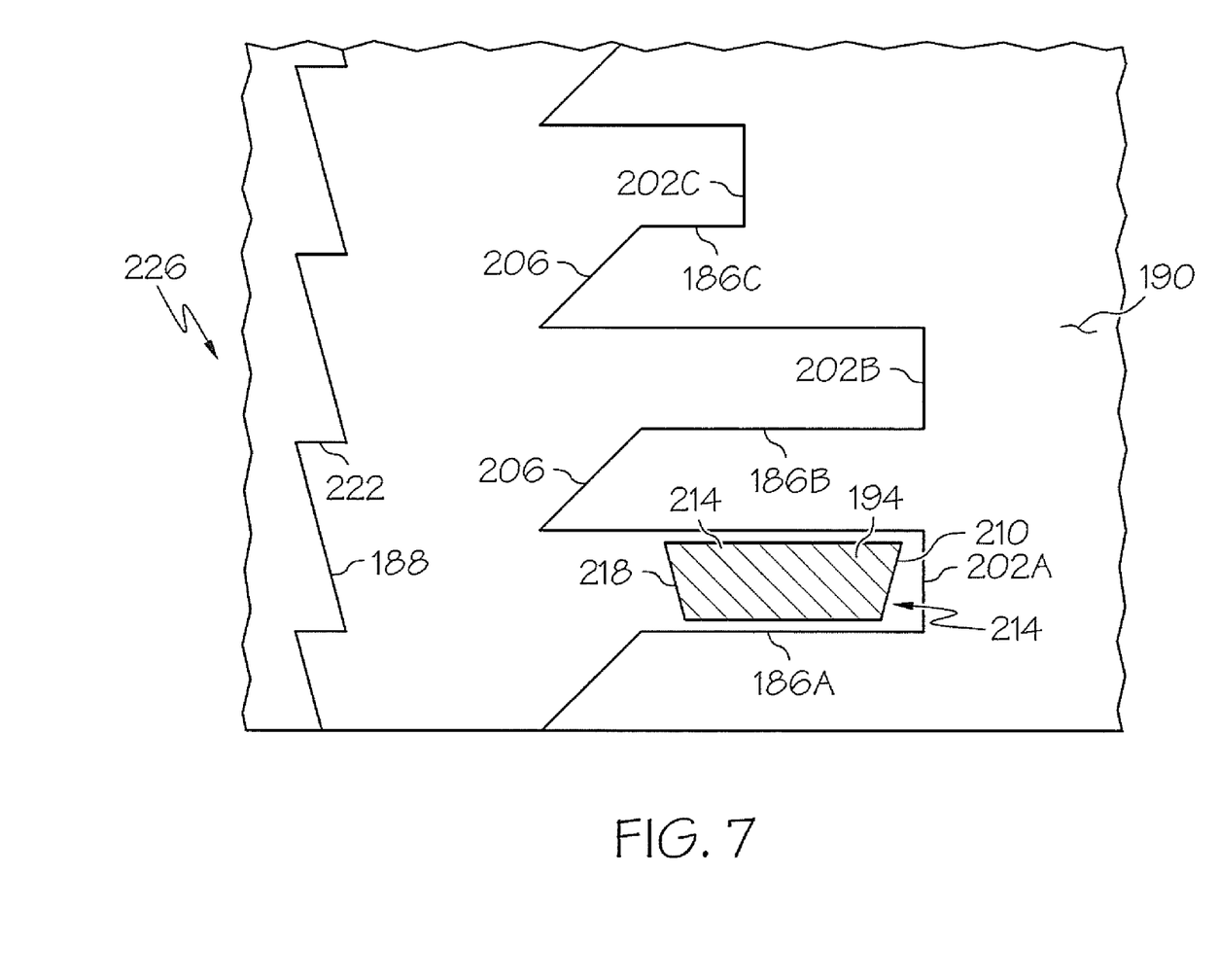
FIG. 7 depicts a partial cross sectional view of the tubular of FIG. 5 taken at arrows 7-7.

Referring to FIG. 7, a plurality of slots 186, with three slots 186A-186C being shown, and a saw tooth stop surface 188 formed in an inner radial surface 190 of the tubular 162 define the extent of the longitudinal movement of the sleeve 170, the deformable arms 126 and the restriction 118. A plurality of tabs 194 radially proud of an outer radial surface 198 of the sleeve 170 slidably engages the slots 186. When the tabs 194 are bottomed against surface 202A or 202B from slot 186A or 186B, respectively, the longitudinal travel of the sleeve 170 allows the first ends 138 of the deformable arms 126 to move into longitudinal alignment with the annular recess 154. The deformable arms 126 being radially unsupported are able to deform from the first deformable arm position to the second deformable arm position, thereby permitting the restriction engager 114 passage by the restriction 118. However, once the sleeve 170 has rotationally indexed to the point that the tab 194 is engaged with the slot 186C, the bottom 202C prevents longitudinal movement of the sleeve 170 (and the deformable arms 126) such that the first ends 138 of the deformable arms 126 remain radially supported by the nonrecessed portion 166. The nonrecessed portion 166 thereby preventing deformation of the deformable arms 126 from the first deformable arm position to the second deformable arm position and passage of the restriction engager 114 therethrough.

Angled surfaces 206 between the slots 186 and angled surfaces 210 on an end 214 of the tabs 194 cause rotational indexing the sleeve 170 when the sleeve 170 is moved toward the bottoms 202. Similarly, the saw tooth stop surface 188 and the angled surface 218 on the tabs 194 cause the sleeve 170 to rotationally index in response to movement of the sleeve 170 under urging of the biasing member 182. Rotational stop surfaces 222 on the saw tooth stop surface 188, act as an escapement 226 to prevent rotation of the sleeve 170 beyond the next slot 186, thereby assure indexing of only one slot 186 per passage of one of the restriction engagers 114.

The foregoing structure provides a well operator with the means to set a restriction 118 to selectively pass a desired number of restriction engagers 114 by forming the tubular 162 with the desired number of shallow slots 186A and 186B before a deep slot 186C.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A selectively movable seat arrangement comprising:
a plurality of seat members movable between a passable position where a member is passable therethrough and an impassable position where the member is prevented from passing therethrough; and
a counter in operable communication with the plurality of seat members, the counter capable of allowing movement of the plurality of seat members to the passable position to allow passage of a member a selected number of times and then to the impassable position thereby preventing passage of another such member for a period of time.

2. The selectively movable seat arrangement of claim 1, wherein the counter includes a plurality of indexable positions with at least one indexable position allowing a member to pass the plurality of seat members and at least one indexable position preventing passage of a member by the plurality of seat members.

3. The selectively movable seat arrangement of claim 2, wherein the plurality of indexable positions are defined by a plurality of teeth on a surface engagable with at least one tooth.

4. The selectively movable seat arrangement of claim 3, wherein indexing of the counter includes advancing engagement of the at least one tooth with at least one tooth of the plurality of teeth.

5. The selectively movable seat arrangement of claim 4, wherein a number of the plurality of teeth defines a number of members allowed to pass.

6. The selectively movable seat arrangement of claim 4, wherein an escapement prevents advancing engagement of more than one tooth per sequential index.

7. The selectively movable seat arrangement of claim 1, wherein indexing of the counter includes advancing engagement of at least one tab within a plurality of slots.

8. The selectively movable seat arrangement of claim 7, wherein a number of the plurality of slots defines a number of members allowed to pass.

9. The selectively movable seat arrangement of claim 1, wherein the counter has an escapement to control indexing of the counter.

10. The selectively movable seat arrangement of claim 1, wherein the member is a ball.

11. The selectively movable seat arrangement of claim 1, wherein the plurality of seat members are movable ball seats.

12. The selectively movable seat arrangement of claim 1, wherein one of the plurality of seat members is non-movable after a selected number of members have passed by the one of the plurality of seat members.

13. The selectively movable seat arrangement of claim 1, wherein the member is sealable to the plurality of seat members.

14. A method of selectively allowing one or more members to pass a seat arrangement before preventing a member from passing the seat arrangement, comprising:
engaging the seat arrangement with one or more members;
moving the seat arrangement and allowing the one or more members to pass the seat arrangement;
engaging the seat arrangement with an additional member; and
maintaining the seat arrangement and preventing the additional member from passing the seat arrangement.

15. The method of claim 14, further comprising indexing a counter each time the one of the one or more members passes the seat arrangement.

16. The method of claim 15, wherein the indexing includes advancing engagement of a tooth with a plurality of teeth.

17. The method of claim 15, wherein the indexing includes advancing engagement of a tab within a plurality of slots.

18. The method of claim 15, further comprising controlling indexing of the counter with an escapement.

19. The method of claim 14, further comprising selectively setting a number of members allowed to pass before the seat arrangement prevents passage of a an additional member.

20. The method of claim 14, further comprising sealingly engaging a member with the seat arrangement.

* * * * *